United States Patent [19]

Engel et al.

[11] Patent Number: 4,658,500

[45] Date of Patent: Apr. 21, 1987

[54] APPARATUS FOR FABRICATING A PLAIN (SLIDING) BEARING

[75] Inventors: Ulrich Engel, Bad Schwalbach; Fritz Niegel, Östrich-Winkel; Jürgen Gröschen, Wiesbaden-Schierstein, all of Fed. Rep. of Germany

[73] Assignee: Glyco-Metall-Werke Daelen & Loos GmbH, Wiesbaden, Fed. Rep. of Germany

[21] Appl. No.: 728,076

[22] Filed: Apr. 29, 1985

[30] Foreign Application Priority Data

Apr. 28, 1984 [DE] Fed. Rep. of Germany ....... 3415929

[51] Int. Cl.$^4$ .................. B21D 53/10; B23P 19/04
[52] U.S. Cl. .................. 29/724; 29/149.50 P; 29/149.5 S; 29/458; 29/527.2; 29/283.5; 72/47; 384/625
[58] Field of Search ............. 29/149.5 R, 149.5 DP, 29/149.5 S, 148.4 R, 458, 527.2, 725, 724, 283.5; 72/46, 47; 308/241

[56] References Cited

U.S. PATENT DOCUMENTS

| 1,331,961 | 2/1920 | Klocke . | |
|---|---|---|---|
| 1,581,394 | 4/1926 | Denn | 29/149.5 R |
| 1,753,435 | 4/1930 | Klocke | 29/149.5 R |
| 1,819,272 | 8/1931 | Short | 29/149.5 R |
| 1,892,178 | 12/1932 | Stockfleth | 29/149.5 DP |
| 1,950,094 | 3/1934 | Stockfieth et al. . | |
| 1,958,089 | 5/1934 | Leis et al. | 29/149.5 R |
| 2,031,982 | 2/1936 | Salzman | 29/149.5 DP |
| 2,242,439 | 5/1941 | Shoemaker et al. | 29/149.5 R |
| 2,534,408 | 12/1950 | Bramberry | 308/241 |
| 2,648,580 | 8/1953 | Lignian | 29/149.5 R |
| 4,351,175 | 9/1982 | Ichikawa et al. | 29/149.5 DP |

FOREIGN PATENT DOCUMENTS

| 523734 | 4/1931 | Fed. Rep. of Germany . |
| 825779 | 9/1950 | Fed. Rep. of Germany . |
| 608800 | 11/1951 | Fed. Rep. of Germany . |
| 1260934 | 2/1964 | Fed. Rep. of Germany . |
| 1938010 | 2/1971 | Fed. Rep. of Germany . |
| 674877 | 2/1930 | France . |
| 395890 | 7/1933 | United Kingdom . |
| 468219 | 11/1936 | United Kingdom . |
| 524128 | 7/1940 | United Kingdom . |
| 655914 | 8/1951 | United Kingdom . |
| 718073 | 11/1954 | United Kingdom . |
| 123691 | 7/1971 | United Kingdom . |

OTHER PUBLICATIONS

DE-AN D 10918 of Jul. 24, 1952, (Application submitted to Deutsche Patentamt by Daimler Benz).

Primary Examiner—Howard N. Goldberg
Assistant Examiner—Ronald S. Wallace
Attorney, Agent, or Firm—Karl F. Ross; Herbert Dubno

[57] ABSTRACT

In a sliding bearing, a metallic layer is coated on a bearing base bush and is provided with grooved or helical or crossing indentations with intermediate elevations. Applied in a uniform manner onto the so-formed metallic layer is a sliding layer of softer material. Under pressure or application of shear forces, the material of the sliding layer provided above the elevations is forced through plastic shaping to flow into the indentations so as to provide a levelled and smooth sliding surface covering the metallic layer.

7 Claims, 15 Drawing Figures

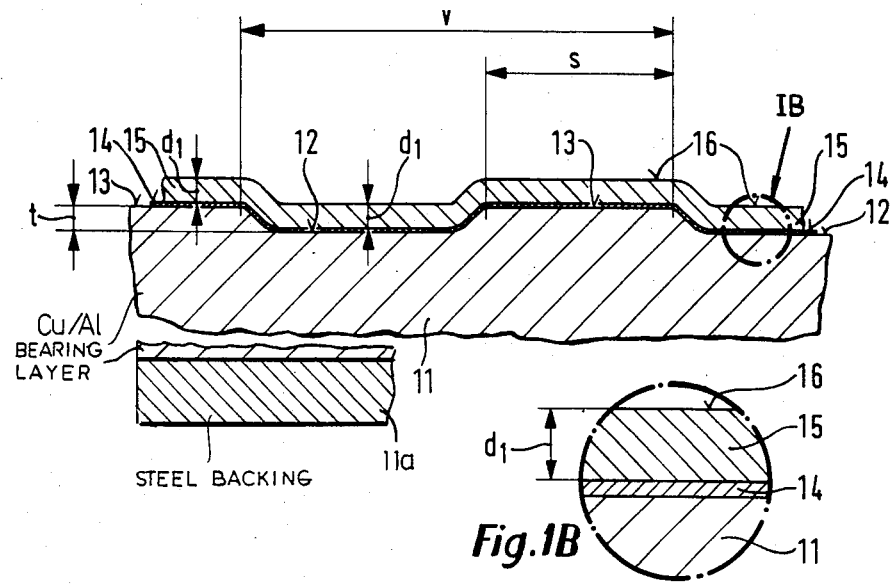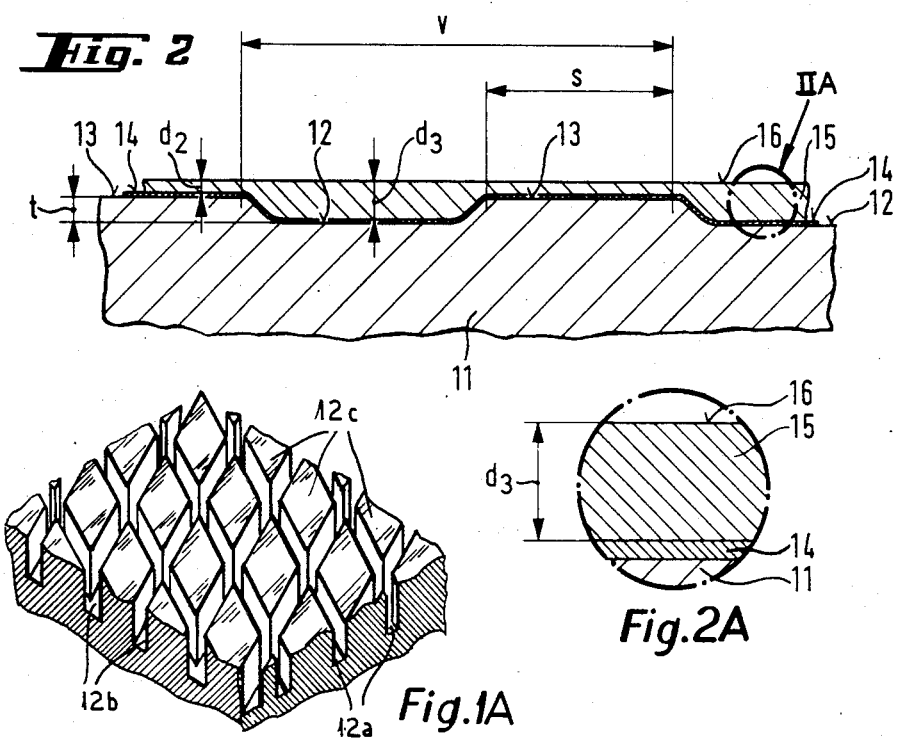

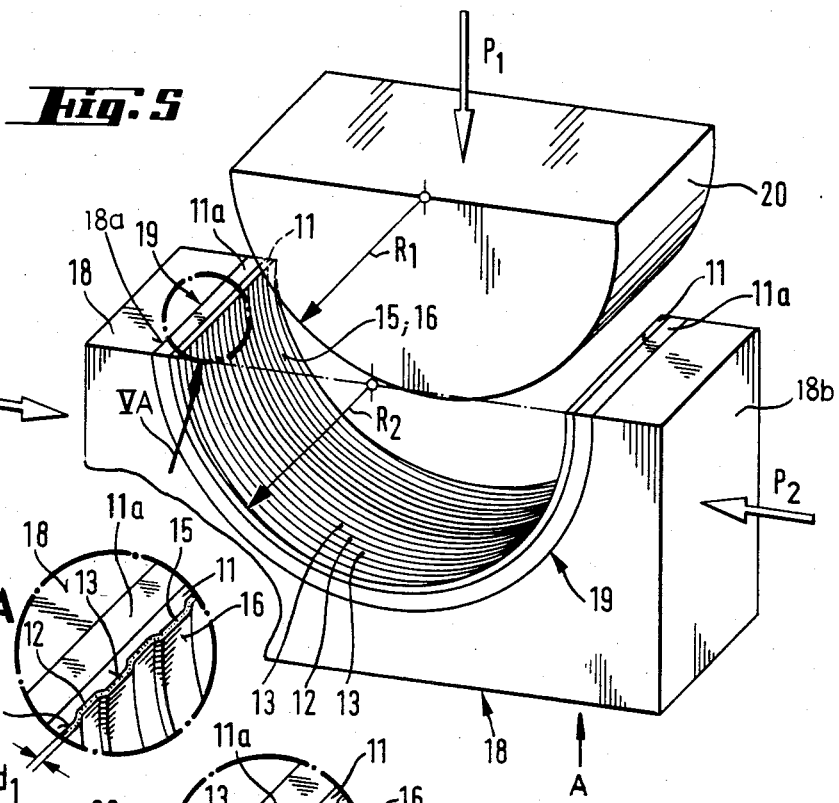
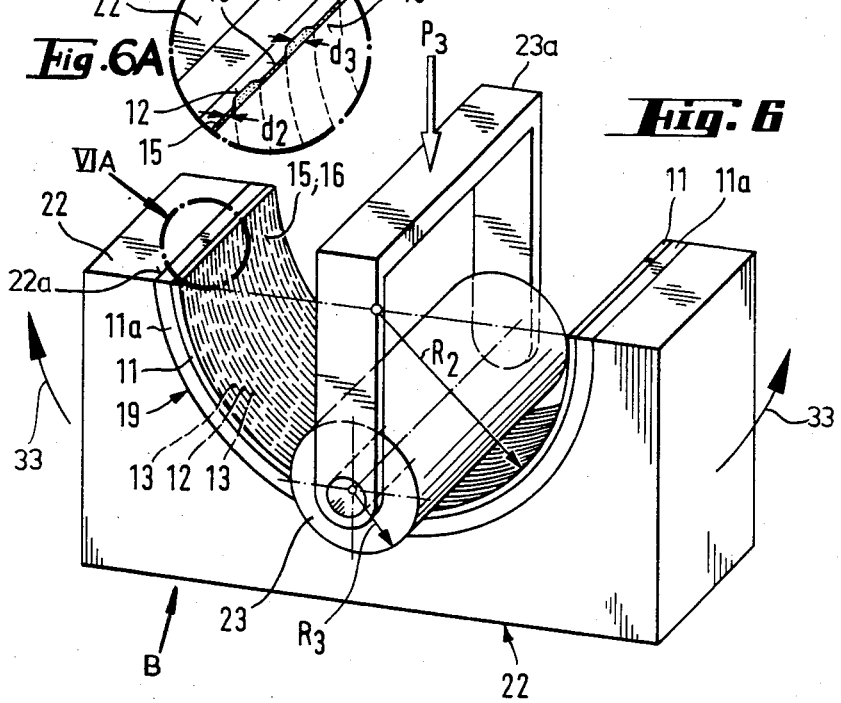

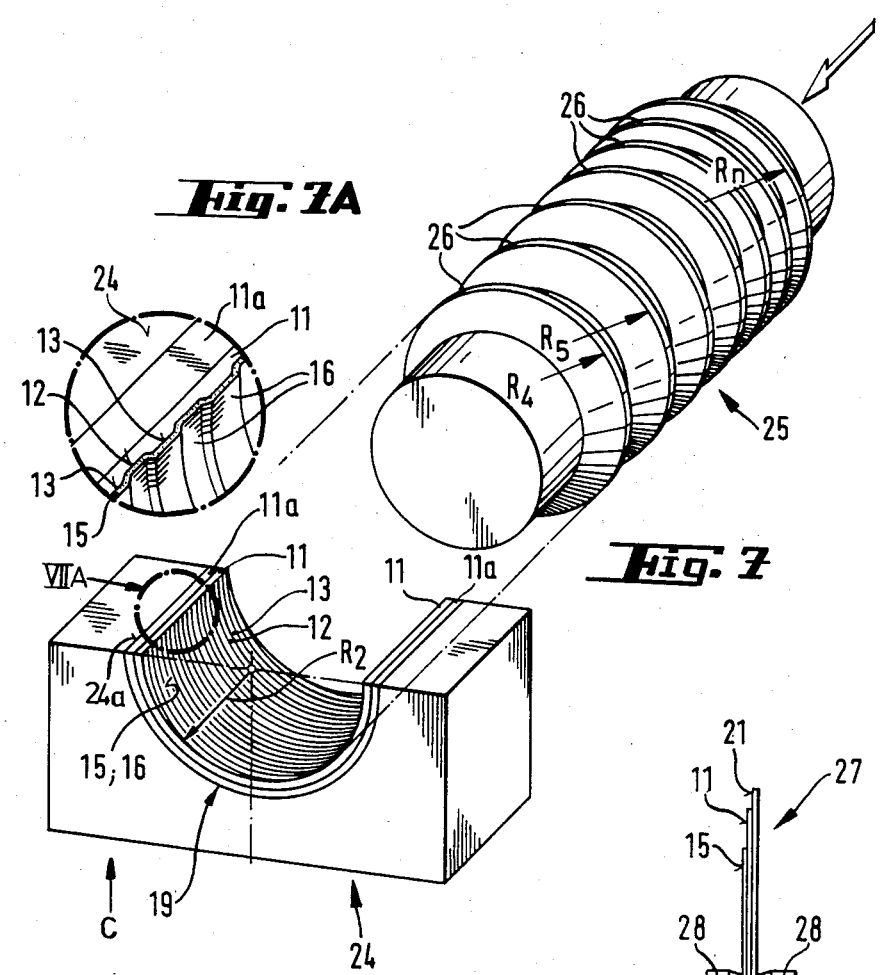
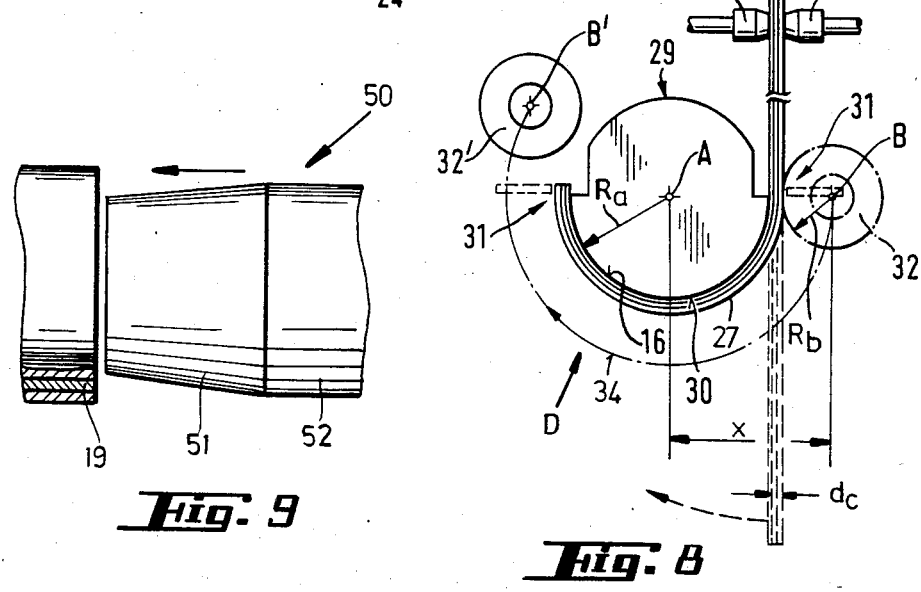

APPARATUS FOR FABRICATING A PLAIN (SLIDING) BEARING

FIELD OF THE INVENTION

Our present invention relates to a plain or sliding bearing with inhomogenous surface layer and more particularly, to a heavy-duty plain sliding bearing, and to an apparatus and a method of making same.

BACKGROUND OF THE INVENTION

A plain or sliding bearing as opposed to a roller bearing has a surface in sliding friction contact with another surface of a moving member, e.g. a shaft to be journaled.

The bearing of British Pat. No. 524,128 has a surface composed of an anti-friction layer which is divided into a plurality of separate sections by thin ribs of metal which is harder than the material used for the anti-friction layer. The ribs extend essentially in circumferential direction of the sliding surface of the bearing and are arranged evenly throughout the bearing metal e.g. in a helical or screwthread pattern. Such bearings are thus also called grooved or helical sliding bearings.

These bearings have the disadvantage that the ridges of the ribs are exposed which means that the hard material (of aluminum or copper) of which these ribs are made is exposed. This considerably complicates the required adjustment of the bearing to the trunnion during the running-in phase. Moreover, the sliding and emergency running properties of the ribs are insufficient during disturbances caused, e.g., by oil deficiency or accumulation of dirt.

Consequently, it has been proposed to coat the ribs with a thin layer of softer lead alloy or tin alloy. In the case of sliding bearings for large engines, the German patent publication No. DE-OS 19 30 010 proposes to provide the metallic layer applied onto the bearing ridges with crossing indentations and to cover it with a layer of softer material by filling the indentations. Although the loading capacity of sliding bearings increases with decreasing thickness of the sliding surface, the support ribs can still be coated with a relatively thick layer between 0.01 to 0.05 mm thickness. This range can easily be maintained by reboring the sliding surface a second time after electroplating.

Highly loaded connecting rod bearings and main bearings of motor vehicles require in general a total thickness of the sliding surface of approximately 0.01 to 0.03 mm. To counter fatigue, this thickness range may also not be exceeded in sliding surfaces of grooved or helical sliding bearings for such engines. In view of the higher load a considerably lower thickness of the cover layer must be selected than would be the case in large motors. To guarantee this thickness range also during an industrial scale manufacture, it is necessary to limit the tolerances during the cutting of the sliding surface to such an extent that an economic production is unattainable. It has been proposed to apply the covering layer in an additional working cycle, e.g. by electroplating, cathodic sputtering or spraying. However, this is complicated and cumbersome and thus also not economical. Moreover, the provision of such an additional working cycle is not technically feasible in some types of bearing materials.

OBJECTS OF THE INVENTION

It is thus the principal object of our present invention to provide an improved sliding bearing which can be produced in a most efficient and economical manner with superior properties.

It is also an object of the invention to provide a highly loadable (heavy duty) plain bearing which manifests, even under extremely high loads, outstanding sliding, wear and corrosion-resistance characteristics during run-in and in emergency operations as well as during normal operations.

It is yet another object to provide an improved method of making such a bearing.

SUMMARY OF THE INVENTION

We realize these objects according to the invention by providing a sliding bearing in such a manner that the first layer which is provided with the indentations and intermediate elevations is covered by a second layer of softer material wherein material of the second layer is forced to flow from the elevations into the indentations to provide a levelled and smooth surface of the second layer over the first layer, i.e. the filling of the indentations is effected by the forced leveling.

By providing a levelled surface only through plastic shaping a highly loadable sliding bearing is obtained which combines the advantages of a multi-layer bearing with the advantages of a grooved or helical bearing as known in large engines. Apart from the extreme load carrying ability, the sliding bearing according to the invention has superior sliding properties, wear and corrosion resistance and is characterized by excellent running-in and emergency running properties.

Preferably, the material thickness of the second or upper sliding layer above the elevations should only be a few micrometers. As tests have shown, this thickness range provides the sliding bearing with improved adaptations properties and anti-seizing properties in comparison to conventional grooved or helical bearings. Moreover, the sliding bearing according to the invention has an increased resistance against erosion of the soft sliding layer within the indentations or grooves.

In the production of such a sliding bearing, the first layer is coated on the base element which can be a steel support shell or an elongated band and then provided with grooved or helical or crossing indentations. Thereafter, the second layer be applied on the first layer in a uniform manner and with a predetermined thickness so that the second layer extends in a wave-like manner over the indentations and elevations. Through the following plastic shaping according to the invention, the wave-like sliding surface is levelled without any additional cutting but solely under application of pressure and/or shear forces.

The levelling of the sliding surface according to the invention prevents the occurrance of abnormally high wear during the running-in phase as this was the case when producing grooved or helical bearings with sliding surfaces in the micrometer range by employing methods known so far. The elevations which consist of harder material are continuously covered by a thin layer of soft and adaptable material.

According to the teachings of the present invention, several apparatuses and methods are applicable to provide the plastic shaping of the second layer. In one technique, the base element is inserted into a press die and then, a pressure ram is pressed against the second or uppermost layer so as to force the softer material to flow from the elevations into the indentations. Preferably, a three-way press is used by which several forces are applied against the base element from different directions so that tolerances of the wall thickness of the press die can be neglected. Advantageously, the forces are directed perpendicular to each other.

As an alternative to the pressing method, the levelling of the sliding surface can be obtained through a rolling method in which the base element provided in a receptacle which swings back and forth is treated by a roller drum which rolls along the second layer under a predetermined pressure.

A further proposal utilizes a calibrating instrument which is moved over the second layer of the base element to level the latter in a non-cutting manner and under prevention of material laminations and material shearings. The calibrating instrument which works like a broach is moved through the usually arched vault of the base element and may consist of several successively arranged disks with gradually increasing radius. The gradation of the radii must be selected in such a manner that no chips are cut.

It is, however, also possible to provide the calibrating instrument with a conical head to which an essentially cylindrical cylinder body is connected.

When using band material as the starting material for the bearing bush to be produced, we can provide a bending and rolling method in which the elongated bond previously coated with the first layer including the indentations and elevations and then with the second layer is pressed by a roller drum against the semi-circular circumference of a roller arbor so that the band is shaped into the eventual form of the bearing bush and its second layer is simultaneously levelled.

According to this method, the grooved or helical profile is not cut into the already finished bearing bush but rather is provided by cutting or plastic shaping in the compound band which is of steel and has been previously coated with the first layer.

BRIEF DESCRIPTION OF THE DRAWING

The above and other objects, features and advantages of our present invention will now be described in greater detail with reference to the accompanying drawing in which:

FIG. 1 is a cross sectional view on an enlarged scale of a slide bearing prior to being treated according to a method of the invention;

FIG. 1A is a perspective detail of a surface of the bearing alloy before coating;

FIG. 1B is a sectional detail of the portion 1B of FIG. 1;

FIG. 2 is a cross sectional view according to FIG. 1 illustrating the slide bearing after being treated according to the method of the invention;

FIG. 2A is a sectional detail of the portion IIA of FIG. 2;

FIG. 5 is a schematic view in perspective illustration of a first embodiment of a device for producing the slide bearing according to the invention;

FIG. 5A is a perspective detail of the portion VA of FIG. 5;

FIG. 6 is a schematic view in perspective illustration of a second embodiment of a device for producing the slide bearing according to the invention;

FIG. 6A is a perspective detail of the portion VIA of FIG. 6;

FIG. 7 is a schematic view in perspective illustration of a third embodiment of a device for producing the slide bearing according to the invention;

FIG. 7A is a perspective detail of the portion VIIA of FIG. 7;

FIG. 8 is a schematic view of a fourth embodiment of a device for producing the slide bearing according to the invention; and FIG. 9 is a diagram showing another calibration technique.

SPECIFIC DESCRIPTION

Figure 3:
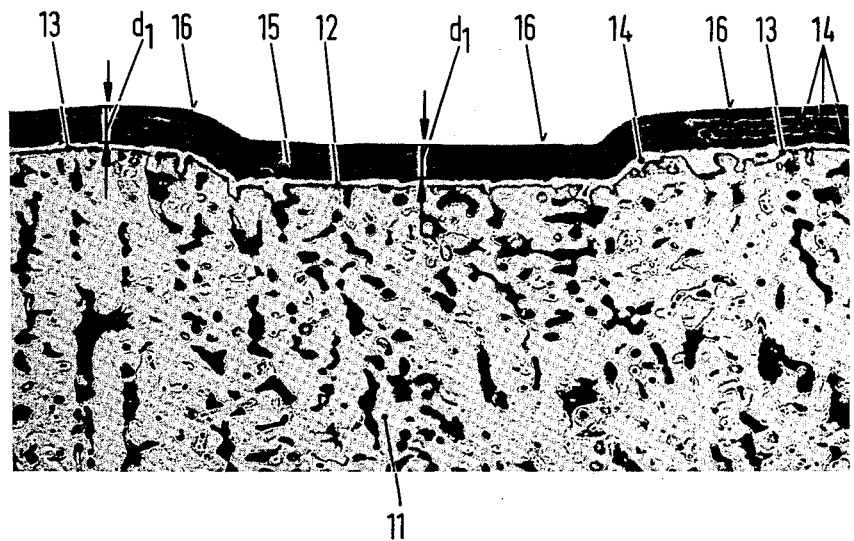
FIG. 3 illustrates a scanning electron microscopic image of the slide bearing of FIG. 1.

FIGS. 1 and 2 show a plain or slide bearing prior and after being treated by a method according to the invention. The slide bearing includes a base or support shell of steel $11a$ on which a metallic bearing layer 11, e.g., based on copper or aluminum is applied by coating the layer 11 on the previously shaped support shell or coating it on a steel strip or steel plate which is then shaped to a semi-circular bearing bush 19 (see e.g. FIG. 5). Along the circumference of its running surface, the metallic layer 11 is provided with indentations 12 extending in a helical manner or constituted by concentric grooves. The indentations 12 are provided, e.g., by respectively boring the surface of the layer 11 and are parted from each other by intermediately extending support webs or elevations 13. As illustrated in FIG. 1, the indentations 12 have a depth t and are spaced from each other in radial direction by a distance v. The width of the elevations 13 in between adjacent circumferential indentations 12 is designated by s.

In the present embodiments, the indentations 12 are provided in a helical manner. It is, however, certainly possible to provide the surface of the layer 11 with crossing indentations $12a$, $12b$ so as to obtain substantially diamond-shaped areas or lands $12c$ by the thus intersecting grooves.

Covering the grooved surface of the layer 11 is a barrier layer or binding layer 14 over which a sliding layer 15 is applied which is made of metal and/or plastic material and in comparison to the metallic layer 11 is of softer consistency.

By providing the barrier layer 14 between the metallic layer 11 and the sliding layer 15 a diffusion of alloy components between the layers in highly stressed slide bearings subjected to considerable temperatures is prevented and thus a damaging of the sliding layer 15 is avoided. The sliding layer 15 is applied onto the barrier layer 14 with a predetermined thickness, e.g., by electroplating, cathode sputtering, spraying or any other suitable coating process and can have a multi-layer structure. It should be noted, however, that the sliding layer 15 may certainly be applied directly onto the metallic layer 11.

As shown in FIG. 1 by a cross-sectional view, when being applied onto the barrier layer 14 or on the metallic layer 11, the sliding layer 15 has a wave-like surface 16 of a predetermined thickness $d_1$ as it covers the grooves 12 as well as the elevations 13. In order to level the surface 16, the latter is subjected to a plastic shaping. Since the material of the sliding layer 15 is sufficiently soft, pressure applied onto the elevations 13 will cause the material to be displaced and to flow into the indentations 12. The pressure is maintained until the surface 16 of the sliding layer 15 is levelled and smooth as shown in FIG. 2. Thus, the elevations 13 which are made of hard material are permanently covered by a soft and adapting layer having a thickness $d_2$ of few micrometers while the layer above the grooved indentations 12 has a thickness $d_3$. The relationship between the thicknesses of the sliding layer 15 prior and after the plastic shaping is thus as follows:

$$d_2 < d_1 < d_3.$$

Figure 4:
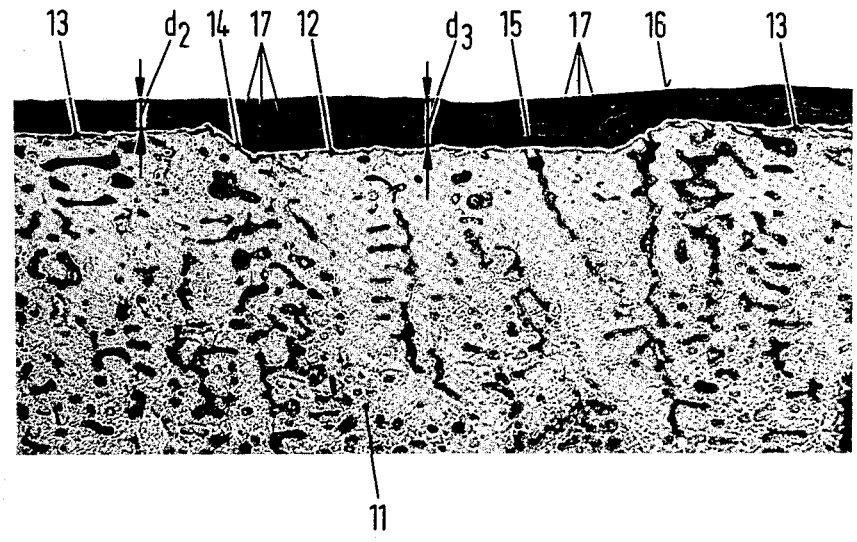
FIG. 4 illustrates a scanning electron microscopic image of the slide bearing of FIG. 2.

Turning now to FIGS. 3 and 4 which show a raster electron microscopic image corresponding to FIGS. 1 and 2. Since FIGS. 3 and 4 are provided to particularly illustrate texture lines 17 of the sliding layer 15, FIG. 3 does not show the wave-like progression of the layer 15. Both images show the metallic layer 11 which is covered by the barrier of binding layer 14 and the sliding layer 15. Prior to the plastic shaping, the sliding layer 15 has homogeneous texture lines 17 which extend uniformly along the elevations 13 and the indentations 12. After applying pressure onto the material of the sliding layer covering the elevations 13 and thus forcing material (which is of softer consistency than the material constituting the elevations 13) to flow into the indentations 12, a cross-linkage of the texture lines 17 is obtained at the junction between elevations 13 and grooved indentations, as clearly shown in FIG. 4. Consequently, an additional reinforcement or hardening (toughening) along the edges of the indentations, i.e., at the junctions to the elevations 13 is obtained because of the cross-linked texture lines 17.

In FIGS. 5 to 8, several embodiments are shown to provide the plastic shaping of the sliding layer 15 as previously described. Referring firstly to FIG. 5 in which a pressing device A is shown including a die 18 which is provided with a semi-circular recess 18a in which the bearing bush 19 with a radius $R_2$ fits in an accurate manner. The bearing bush 19 is already covered with the metallic layer 11 having grooved indentations 12 and intermediate support elevations 13. Once being inserted, a pressure ram 20 is pressed onto the bearing bush 19 by applying a force $P_1$ in direction of the indicated arrow until the surface 16 of the sliding layer 15 is levelled. The pressure ram 20 is of semi-circular shape and has such a radius $R_1$ so as to match precisely the facing contour of the bearing bush 19. For achieving the requested levelling of the surface 16 along the entire circumference of the sliding layer 15, the selection of the ratio between the radii $R_1$ and $R_2$ as well as the application of a sufficient pressing force $P_1$ is of importance.

Especially advantageous is the use of the pressing device A as three-way press in which the bearing bush 19 is subjected to pressure applied from various directions, preferably in directions normal to each other. In the embodiment of FIG. 5, the additional forces $P_2$ act on the lateral walls 18b of the die 18 (as indicated by the respective arrows) so as to be normal to the force $P_1$. Through the application of these three forces, a uniform levelling of the surface 16 is secured as the forces $P_2$ will press the bearing bush 19 against the pressure ram 20. Thus, although the wall thickness of the bearing bush 19 varies within certain tolerances, the levelling of the sliding surface 16 will not be affected thereby.

In order to allow the forces to act in an even more uniform manner, the die 18 or the pressure ram 20 can be floatingly or resiliently suspended.

The desired ratio of the layer thickness $d_2$ above the indentations 12 and of the layer thickness $d_3$ above the elevations 13 is dependent on the radius $R_1$ of the pressure ram 20 and the radius $R_2$ of the bearing bush 19 as well as on the pressure forces $P_1$, $P_2$ and the thickness $d_1$ of the sliding layer 15 prior to the plastic shaping. Further parameters to be considered are the material properties as well as the profile of the indentations 12, i.e., the distance v between the elevations 13, the width s of the elevations and the depth t of the indentations 12. If necessary, the bearing bush 19 can be heated in order to support the levelling or smoothing of the surface 16. In some cases, it may be sufficient to provide the plastic shaping not along the entire width s above the support elevations 13 but only partially, e.g., along the apex.

In FIG. 6, a rolling device B is shown for levelling the sliding surface 16 of the layer 15 and including a receptacle 22 provided with a semi-circular recess 22a. Fitted in an accurate manner within the recess 22a is the bearing bush 19 having the radius $R_2$ and against which a roller drum 23 is pressed by applying a force $P_3$ onto handle 23a. The drum 23 has a radius $R_3$ which is smaller than the radius $R_2$. In order to provide the rolling motion of the drum 23 along the circumference of the bearing bush 19, the receptacle 22 and the bearing bush 19 is caused by suitable means (not shown) to swing back and forth in direction of arrows 33 so that under force $P_3$, softer layer material on the elevations 13 is forced into the indentations 12 and the surface 16 is uniformly levelled and smoothed.

The rolling step can be executed in one or several gradual steps. For obtaining optimum results upon levelling the surface 16, the parameters as radius $R_2$ of the bearing bush 19, radius $R_3$ of the drum, force $P_3$, layer thickness $d_1$, $d_2$, $d_3$, distance v between the elevations 13 and depth t of the indentations depend on each other and thus must be correspondingly coordinated.

Turning now to FIG. 7, which shows a calibrating device C including a receptacle 24 provided with a semi-circular recess 24a in which the bearing bush 19 with radius $R_2$ is accurately inserted The surface 16 is levelled by a calibrating instrument 25 which is moved in a similar manner as a broach over the concave arch of the sliding layer 15 of the bearing bush 19 so as to level the surface 16. In the embodiment of FIG. 7, the calibrating instrument 25 includes a plurality of successively arranged disks 26 of gradually increasing radii, i.e., radius $R_4$ of the foremost disk 29 is smaller than the next following radius $R_5$ which in turn is smaller than the radius of the next following disk 26 and so on ($R_4 < R_5 < R_n$). The radii of the disks 26 must be adjusted to each other in order to prevent a chip removal from the bearing bush 19 during calibrating of the surface 16.

In addition to the dependency of the radii of the disks 26 on each other, the surface contour of the calibrating instrument 25, i.e., of the disks 26 must be considered as well as the dimensions of the layer thicknesses $d_1$, $d_2$, $d_3$, depth t and distance v of the indentations 12 and width s of the elevations 13 to preclude shearing and lamination of the material. Considering these factors, upon movement of the calibrating instrument 25, sliding material is moved from the support elevations 13 into the indentations 12 so as to provide a levelled surface 16 of the sliding layer 15.

For achieving a levelled surface 16 of the sliding layer 15 of high strength, the calibrating instrument 25 is moved from both sides through the concave arch of the bearing bush 19.

Apart from the design of the calibrating instrument 25 as described in FIG. 7, it may be noted that any other suitable design is possible. For instance, the calibrating instrument can be provided with a conical head to which an essentially cylindrical calibrating body is connected. This embodiment is, however, not shown.

A further embodiment for providing a sliding bearing with levelled and smooth surface is illustrated in FIG. 8 which refers to the instance when band material is used as base for producing the bearing bush 19. Accordingly, a bending and rolling device D is shown which includes opposing clamping jaws 28 retaining an elongated compound or sandwich band 27 which is then to be shaped into the bearing bush of the sliding bearing. The compound band 27 consists of a sheet steel which is coated with the metallic layer 11, e.g., by roller plating. In contrast to the previously described embodiments, the grooved or helical profile is not provided in the already finished bearing bush but is cut or plastically shaped into the semi-finished compound band consisting of steel and metallic layer 11. Thereafter, the barrier or binding layer 14 and finally the sliding layer 15 is applied to obtain the compound band 27 which is then shaped in the bending and rolling device D and has a structure and profile as illustrated in FIGS. 1 and 3 whereby the grooved indentations 12 and the elevations 13 extend parallel to each other or with a pitch to the longitudinal axis of the compound band 27.

As can be seen from FIG. 8, the bending and rolling device D further includes a roll arbor 29 which has one portion of semi-cylindrical shape so as to define a circumference 30 around which the compound band 27 is eventually bent and simultaneously rolled to provide the levelling of surface 16 of the sliding layer 15. The semi-cylindrical portion of the arbor 29 has a radius $R_a$ as measured from its respective center A.

Cooperating with the roll arbor 29 and arranged at a distance thereto is a press drum 32 which is rotatable about its center B and has a radius $R_b$. The press drum 32 is connected to a not shown swivel arm which causes the drum 32 to move along a predetermined path—as indicated by dash-dot line 34—around the circumference 30 of the arbor 29. The connection of the swivel arm to the press drum 32 is such that the swivel axis of the swivel arm extends in the center A of the roll arbor 29.

In order to provide a correct relationship between the roll arbor 29 and the press drum 32, the distance of their respective centers A and B is slightly smaller than the total amount of the length of the radii $R_a$ and $R_b$ and the width $d_c$ of the compound band 27.

When being clamped between the jaws 28, the compound band 27 has a still elongated shape as indicated by dotted line 35. The press drum 32 is in its starting position which is indicated in dash-dotted line at the right hand side of the arbor 9. Thereafter, the swivel arm is actuated to rotate the drum 32 about the circumference 30 of the arbor 29 so that the compound band 27 is pressed against and bent around the arbor 29. Pressure is thus applied against the surface of the compound band 27 provided with the sliding layer 15 so that layer material above the elevations 13 is carried off and forced to flow into the indentations 12. Through proper selection of the pressure by which the compound band 27 is pressed against the arbor 29 through the press drum 32 and by properly coordinating the interrelated parameters as radii $R_a$ and $R_b$, thickness $d_1$ of the sliding layer 15, the compound band 27 can be shaped to a bearing bush 19 and simultaneously provided with a levelled surface 16. The so-bent compound band is severed from the remaining portions thereof by opposing cutters 31 which are arranged at the arbor 29 at the end sections of the semi-cylindrical circumference 30 so that the bearing bush can eventually be provided.

We should note, however, that there are instances in which an exact coordination of the individual parameters is not feasible so that the described bending and rolling process will not result in the desired surface quality of the bearing bush 19; in these instances, the levelling and smoothing of the sliding surface 15 through rolling should be provided prior to the actually bending step.

It is, however, also possible to provide a two-step operation to level the surface 16 and to form the compound band 27 to the bearing bush. In a first step, rolling of the surface 16 is provided while during the second step, the compound band 27 is bent and simultaneously the rolling action and thus further levelling of the sliding layer 15 takes place. In both steps, the applied pressures during rolling and bending are coordinated such that portions of the softer material covering the elevations 13 flows into the indentations 12 so as to provide a sliding bearing with smooth and levelled surface and in any case the support elevations 13 are covered by a thin sliding layer 15 of a thickness of few micrometers.

In FIG. 9, the coating material is forced into the goods and the bearing is calibrated by a calibrating tool 50 having a conical head 51 followed by a substantially cylindrical calibrating body 52.

We claim:

1. Apparatus for producing a sliding bearing, comprising:
   first coating means for covering a bearing base element with a first layer having a surface;
   forming means for providing said surface with indentations and intermediate elevations;
   second coating means for applying a second layer of predetermined thickness onto said first layer wherein said second layer is of softer material than the material of said first layer; and
   treating means for forming portions of said second layer covering the elevations through plastic shaping to flow into the indentations so as to obtain a levelled and smooth surface and to provide said second layer of requested thickness above the elevations.

2. An apparatus as defined in claim 1 wherein said treating means includes a press die in which said base element provided with said first and second layers is inserted, and a pressure ram having a contour adapted to the contour of said facing base element, said pressure ram being movable in direction towards said base element so as to force material from said elevations to flow into said indentations.

3. An apparatus as defined in claim 1 wherein said treating means includes a receptacle in which said base element provided with said first and second layers is inserted, and a roller drum rolling on said base element along said second layer so as to force material from said elevations to flow into said indentations.

4. An apparatus as defined in claim 1 wherein said treating means includes a receptacle in which said base element provided with said first and second layers is inserted, and a calibrating instrument movable over said base element so as to force material from said elevations to flow into said indentations.

5. Apparatus as defined in claim 4 wherein said calibrating instrument includes a conical head and an essentially cylindrical calibrating body connected to said head.

6. An apparatus as defined in claim 4 wherein said calibrating instrument includes a plurality of successively arranged calibrating disks with gradually increasing radius.

7. Ap apparatus as defined in claim 1 wherein said treating means includes clamping jaws to retain said base element provided with said first and second layers and being in a band-like elongated form, a roll arbor having a circumferential section defining the shape of said base element, a roller drum arranged at a distance to said roll arbor so that said elongated base element extends therebetween, said roller drum being movable around said roll arbor so as to bend said base element and level said second layer by pressing said base element against said circumferential section of said roll arbor, and cutters connected to said roll arbor to sever said bend base element.

* * * * *